United States Patent [19]
Banfield

[11] Patent Number: 5,942,177
[45] Date of Patent: Aug. 24, 1999

[54] METHOD FOR A MAKING A SEPARABLE FASTENER HAVING A PERIMETER COVER GASKET

[75] Inventor: Donald L. Banfield, Manchester, N.H.

[73] Assignee: Velcro Industies B.V., Curacao, Netherlands Antilles

[21] Appl. No.: 09/119,418

[22] Filed: Jul. 20, 1998

Related U.S. Application Data

[60] Division of application No. 08/691,998, Aug. 2, 1996, Pat. No. 5,786,061, which is a continuation-in-part of application No. 08/684,109, Jul. 19, 1996, Pat. No. 5,736,217, which is a continuation of application No. 08/536,965, Sep. 29, 1995, Pat. No. 5,540,970, which is a continuation of application No. 08/390,150, Feb. 21, 1995, abandoned, which is a continuation of application No. 08/087,917, Jul. 6, 1993, abandoned, which is a continuation-in-part of application No. 07/976,485, Nov. 16, 1992, abandoned, which is a continuation of application No. 07/695,183, May 3, 1991, abandoned.

[51] Int. Cl.[6] .................................................. B29C 33/16
[52] U.S. Cl. ...................... 264/134; 264/274; 264/275; 428/100; 427/154; 24/442
[58] Field of Search ............................... 428/99, 100, 120, 428/192; 264/134, 274, 275; 24/442; 427/154

[56] References Cited

U.S. PATENT DOCUMENTS

| | | | |
|---|---|---|---|
| 3,913,183 | 10/1975 | Brumlik | 24/204 |
| 4,198,734 | 4/1980 | Brumlik | 24/204 |
| 4,693,921 | 9/1987 | Billarant et al. | 428/100 |
| 4,710,414 | 12/1987 | Northrup et al. | 428/43 |
| 4,726,975 | 2/1988 | Hatch | 428/100 |
| 4,842,916 | 6/1989 | Ogawa et al. | 428/100 |
| 4,931,344 | 6/1990 | Ogawa et al. | 428/100 |
| 5,171,395 | 12/1992 | Gilcreast | 156/500 |
| 5,259,905 | 11/1993 | Gilcreast | 156/250 |
| 5,286,431 | 2/1994 | Banfield et al. | 264/134 |
| 5,500,268 | 3/1996 | Billarant | 428/100 |
| 5,540,970 | 7/1996 | Banfield et al. | 428/100 |
| 5,554,239 | 9/1996 | Datta et al. | 156/66 |
| 5,606,781 | 3/1997 | Provost et al. | 24/452 |

FOREIGN PATENT DOCUMENTS

| | | | |
|---|---|---|---|
| 0 138 724 A2 | 4/1985 | European Pat. Off. | A47C 31/02 |
| 0 246 221 A2 | 11/1987 | European Pat. Off. | A44B 18/00 |
| 0 439 969 A1 | 8/1991 | European Pat. Off. | B29C 33/00 |
| 2047243 | 3/1971 | France | A44B 21/00 |
| 2405123 | 5/1979 | France | B29C 27/14 |
| WO 92/19119 | 11/1992 | WIPO . | |
| WO 95/01741 | 1/1995 | WIPO . | |

*Primary Examiner*—Alexander Thomas
*Attorney, Agent, or Firm*—Steven J Weissburg

[57] ABSTRACT

A separable fastener component for use with a complementary separable fastener component has a base member, having a nominal fastening face and a non-fastening face. Carried on the fastening face is a pattern of fastening elements, comprising an interior region carrying fastening elements that are free of any cover. Substantially surrounding the interior region is a perimeter region that carries fastening elements which are covered. The perimeter region of covered fastening elements may be a rectangular or non-rectangular annulus. The fastening elements may be hooks or loops.

The fastening component may be incorporated into a molded product, with minimal intrusion of the molding material into the fastening elements of the main region. The perimeter cover forms a gasket seal with the mold in several different configurations and prevents molding material from infiltrating to the uncovered interior region of fastening elements. The perimeter cover need not be removed for use of the fastener component, because the uncovered interior fastening elements function normally.

An assembly line method of making the fastening component and a method of molding the fastening component into an article are also disclosed. The cover around the perimeter may be applied either by applying cover material to the perimeter region only, or over the entire fastener area, and then removing the cover material from an interior region.

11 Claims, 7 Drawing Sheets

METHOD FOR A MAKING A SEPARABLE FASTENER HAVING A PERIMETER COVER GASKET

CROSS-REFERENCES

This is a divisional of Ser. No. 08/691,998, Aug. 2, 1996, U.S. Pat. No. 5,786,061 which is a continuation in part of application Ser. No. 08/684,109, filed on Jul. 19, 1996, U.S. Pat. No. 5,736,217 with Express Mail Label No. EM479605894US, which was a continuation of U.S. application Ser. No. 08/536,965, filed on Sep. 29, 1995, issued on Jul. 30, 1996 as U.S. Pat. No. 5,540,970, which was a continuation of U.S. application Ser. No. 08/390,150, filed on Feb. 21, 1995, abandoned, which was a continuation of U.S. application Ser. No. 08/087,917, filed on Jul. 6, 1993, abandoned, which was a continuation in part of application Ser. No. 07/976,485, filed on Nov. 16, 1992, abandoned which was a continuation of U.S. application Ser. No. 07/695,183, filed on May 3, 1991, abandoned. The disclosures of the original '183 application and of the continuation in part U.S. Pat. No. 5,540,970 are hereby incorporated by reference in their entirety. Also incorporated by reference is the disclosure of issued U.S. Pat. No. 5,286,431, issued on Feb. 15, 1994, which was a division of the original '183 application, and which has a virtually identical disclosure.

BACKGROUND

This invention relates to a separable fastener, particularly of the hook and loop type, for attachment to other objects such as polyurethane foam seat cushions or hard plastic parts for automobiles, furniture and the like. One portion of such a separable fastener is typically incorporated into the plastic object or polyurethane seating foam during a molding process for subsequent attachment to another object carrying the mating portion of the separable fastener. The fastener of this invention greatly simplifies the method of molding the part to which it is attached. Although particular reference is made herein to elastomeric polyurethane foam or hard plastic parts, it is to be understood that a fastener product according to this invention can be used in parts made from a wide variety of materials, e.g. thermoplastic materials, thermoset materials, elastomers, or any other moldable composition, and such compositions are referred to broadly as "plastics."

Hook and loop separable fasteners, such as those sold by the assignee of this invention under the trademarks "VELCRO" and "ULTRAMATE," are well known and used to join two members detachably to each other. This type of fastener has two components. Each has a flexible substrate or base having one component of the fastening system on the surface thereof. One surface typically carries resilient hooks while the other carries loops. When the two surfaces are pressed together they interlock to form a releasable engagement.

The hooks can be any of a variety of shapes, including cane-shaped hooks, palm tree-shaped hooks and mushroom-shaped hooks, all of which are well known within the art. As used within this application, the terms "hook," "hook-type" and "hook-like" shall be construed to cover any such configuration of loop-engaging element.

Separable fasteners are used in the manufacture of automobile seats in the attachment of an upholstered seat cover, hereinafter called trim cover, to a polyurethane foam bun. One portion of the separable fastener is incorporated into the surface of the polyurethane seat bun during the foam molding process. The mating portion of the separable fastener is attached to the seat cover to provide releasable attachment to the foam seat bun. The separable fastener assembly used in the foam mold for incorporation in the bun surface typically is the hooked portion of the separable fastener system. This hook portion has a base carrying resilient hooks on one surface. The surface of the base obverse of the hook-carrying surface may act as an anchoring surface by a variety of configurations well known in the art. In some assemblies a magnetically attractive material is attached to the base to facilitate placement of the assembly in a trough of the mold cavity wall, which is equipped with magnets. A protective layer, often in the form of a thin plastic film, is placed over the resilient hooks to prevent incursion of foam into the hooks during the molding process. Significant foam contamination of the hooks would affect their ability to engage with the mating portion of the fastener. Such fastening devices are applied to one surface of a clamshell mold; a chemical mixture, usually of a diisocyanate and a polyol, are injected into a mold; the upper surface of the mold is closed and clamped shut while the chemicals react and blow to form a flexible foam, well known in the art.

Prior-art assemblies, including those disclosed in U.S. Pat. Nos. 4,726,975, 4,673,542, 4,563,380 and 4,693,921 employ a thin film to prevent the incursion of foam into the fastener elements of the separable fastener during molding. French Patent 2,423,666 discloses a system for sealing the edges of the tape in the mold trough by jamming the edges of the fastener into the trough.

Two patents from which the present document claims priority disclose another arrangement for protecting the fastening elements from degradation and fouling by the foaming material. U.S. Pat. No. 5,286,431, issued on Feb. 15, 1994, to Banfield and Rocha, entitled MOLDED PRODUCT HAVING INSERT MOLD-IN FASTENER, discloses a fastener of the hook and loop type having a base member and a plurality of engaging elements upstanding from one surface thereof. An elastomeric or rubber encasement (which may be either thermoplastic or thermoset) that intimately surrounds the individual engaging elements, substantially filling all of the space around each one, protects the elements when they are exposed to the harsh environment of a molding process. The fastener is placed in a mold and molded into, as an integral part thereof, a plastic part. The encasement is removable from the engaging elements after the molding process, to expose the engaging elements, without permanently deforming or substantially destroying the fastening performance thereof. U.S. Pat. No. 5,540,970, issued on Jul. 30, 1996 to Banfield et al., entitled DIE CUT MOLD-IN, further discloses providing the elastomeric cover so that the tips of the hooks are slightly exposed. Other modifications of the invention are shown in the '970 patent as well. The disclosures of both of these patents are incorporated fully herein by reference.

All of the arrangements discussed above that entail covering the fastening elements that are to be used to attach the molded product to a trim cover or companion piece, require that the molding operation include a step to remove the protective cover, be it a film-like cover or a space filling, encasing cover. This entails a significant inconvenience for the molding operator. Further, once removed, the cover is in the possession of the molding operator, who must dispose of it. But, the molding operator is not the one who could use the cover, even if it were to be recyclable. (It is the fastener manufacturer who is in the best position to reuse the cover.) Thus, from the perspective of the molding operator, it is very beneficial to be able to use a fastening component that does not require a cover. Consequently, those whose business it is to make the fastening component to be incorporated into the molded article are interested in providing to the molding operator a component that does not have a cover that needs to be removed after molding.

It is also typically desirable to avoid any apparatus that can not be used with a conventional mold, having a simple flat bottom trench for placement of the fastening element. Otherwise, the molding operator must alter its normal equipment and way of doing business.

Thus, it is an object of the invention to provide a separable fastener component that can prevent intrusion of a molding material into the spaces between the individual engaging elements (typically hook-like elements) without requiring that a protective cover be removed after the product to which the fastener is attached, is molded. It is a further object to facilitate the manufacture of objects to which such a separable fastener component is attached, such as by molding. Another object is to provide molded articles with integral fastener components, without fouling the fastener elements of the fastener components with molding material.

SUMMARY

The present invention is a touch fastener component that can be used without the removal of any protective cover after use by the molding operator. A cover covers a relatively narrow perimeter region of fastening elements, for instance hooks, leaving an interior region of fastening elements uncovered. The cover typically fills the space around each of the covered hooks, but may also be in a tent-like, enveloping configuration where some empty space is adjacent the fastening elements. The cover goes around the entire perimeter of the fastening component. The fastening component can be used in a mold having a trench. The fastener is attracted to the mold wall, typically being attracted to a bottom face of the trench by magnets or adhesive. The cover over the covered hooks forms a gasket seal all around the perimeter of the part, sufficiently tight so that no molding material can intrude into the interior region. After molding is completed, the molded part is removed from the mold, with the fastener component embedded therein. The perimeter cover is relatively narrow. The molded object can be secured to a piece of trim cover in the normal fashion, by mating the corresponding fastener components of the trim cover to the uncovered fastening elements in the interior region, without removing the perimeter cover.

The trench may be sized such that gasket seals form on either its bottom face, the side walls or both. The tips of the fastening elements may poke through the cover slightly, forming pinholes, as long as the gasket seal can be maintained against the inflow of molding material. Various materials can be used for the gasket cover and the molded object. The fastener component can be virtually any shape, and can be bent to a non-planar configuration, such as around the corner of a cushion.

More specifically, a preferred embodiment of the invention is a separable fastener component for use with a complementary separable fastener component. The separable fastener component comprises a base member, having a nominal fastening face and a non-fastening face, and carried on the fastening face, a pattern of fastening elements, the fastening elements selected from the group consisting of hook-type and loop-type elements. The pattern comprises an interior region of fastening elements, free of any cover and, substantially surrounding said interior region, a perimeter region. Covering each of the fastening elements of the perimeter region is a cover.

The cover may completely cover the fastening elements, or it may only partially cover some of the fastening elements, leaving the tips of some of the fastening elements slightly exposed.

The fastener may have a rectangular outline, with a rectangular interior region and a rectangular annular perimeter region. Alternatively, the shape may be non-rectangular, or any shape, with any shape of annular perimeter covered region.

The cover material may be selected from the group consisting of: foamed and unfoamed versions of: thermoplastic polyethylene; thermoset polyethylene; polyurethane; thermoplastic polyolefin; thermoset polyolefin; thermoplastic polyvinyl chloride (PVC); thermoset PVC; silicone; styrene butadiene rubber; natural rubber; ethylene vinyl acetate (EVA); and ethylene propylene rubber (EPDM).

The covered perimeter section has a substantially uniform width around its perimeter. Typically, the perimeter region has an average width of between two and ten mm, between an interface of the interior and the perimeter regions and an outer edge of the perimeter region, with three mm being preferred. This typically covers between one and two fastening elements (hooks) across, inclusive.

In a preferred embodiment, the cover intimately surrounds and substantially fills any space around each of the covered fastening elements. In another preferred embodiment, the cover envelops each of the covered fastening elements like a tent around a pole, with some space around some of the covered fastening elements remaining unfilled.

In another preferred embodiment, the fastening elements are hooks.

For yet another preferred embodiment, the fastening elements terminate in a tip and the cover extends beyond the tip a loft of between 0 and 3 mm, preferably on the order of 0.4 mm.

In still another preferred embodiment, the cover is sufficiently flexible, sized and continuous such that if the fastener component is placed in a trench of a mold having a bottom face and side walls, and the fastener component is forced against at least one of the bottom face and the side walls, and molding material is introduced into the mold, the cover forms at least one gasket seal with the mold and prevents any molding material from flowing past the cover into the interior region of fastening elements. The fastener component can be fit into the trench in an interference or non-interference fit. It can be forced against the walls with magnetic attraction.

Another preferred embodiment of the invention is a molded product having a body of solidified molding material, with at least one surface and an interior body region. Fixed to the surface of the molded body is a separable fastener component in any of the forms described above. The fastener may be secured generally in a planar configuration on one face of the molded body, or it may conform to a more complex, non-planar configuration, such as around the corner of a molded cushion. The molded body may be molded from polyurethane, polystyrene, polyvinyl chloride, polyolefin, polyester, polyamide, synthetic rubber and the like. The interior region carrying fastening elements is substantially free of molding material.

Another embodiment of the invention is a fastener component such as described above, mated with a mating fastener component to form a fastener pair.

Another embodiment of the invention is a method for embedding a separable fastener component into a molded article. The method comprises the steps of providing a separable fastener component according to any of the embodiments described above and placing the separable fastener component into a mold, with the fastening face facing a wall of the mold, the wall of the mold comprising a trench, shaped and sized to accommodate both the interior region carrying uncovered fastening elements and the perimeter region carrying covered fastening elements. The separable fastener component is secured against the mold such that at least one gasket seal is formed between the cover and the mold wall. Molding material is provided to the mold, particularly in the region of said placed separable fastener.

According to another preferred embodiment of the invention, the trench is shaped and sized to accept the fastener component substantially without interference. The securing step comprises attracting the fastener component to the mold wall using magnetic attraction sufficient to deform the cover to a degree sufficient to form a gasket seal against substantially any intrusion of any molding material into the uncovered interior region.

According to yet another preferred embodiment of the invention, the trench is shaped and sized to accept the fastener component with an interference fit of sufficient tightness to retain the fastener component in a fixed position during the step of introducing molding material into the mold. The placing step comprises flexing the fastener component during introduction into the mold to a degree sufficient to deform the cover to a degree sufficient to form a gasket seal against any substantial intrusion of any molding material into the uncovered interior region.

BRIEF DESCRIPTION OF THE DRAWINGS

These and other features, aspects, and advantages of the present invention will become better understood with regard to the following description, appended claims and accompanying drawings, where:

DETAILED DESCRIPTION

Figure 2A:
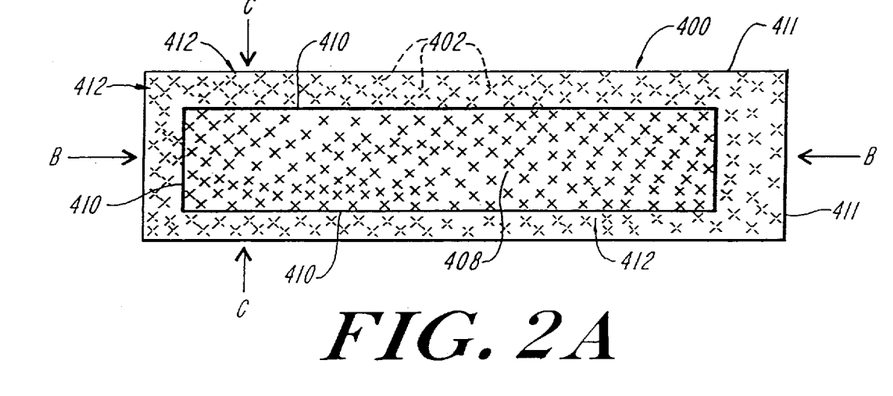
FIG. 2A is a schematic plan representation of a separable fastener component of the invention, having a generally rectangular interior uncovered section and a surrounding rectangular annular perimeter section of covered fastener elements.

A preferred embodiment of a fastener of the invention is shown in FIG. 2A, which is a plan view of a hook-type component 400 of a separable fastener pair of cooperating components. Hook-type coupling or engaging elements 402 are carried by the fastener component as discussed below. The hook-like coupling elements to be provided on the fastening side 404 (FIG. 2B) of the base 406 of the fastener component 400 according to the present invention may be of mushroom, hook, palm tree, or umbrella shape or of any shape as long as they have coupling and uncoupling functions. (All such shapes are hereinafter referred to generally as "hooks" or "hook-like or hook-type coupling elements.") For example, the hook-like coupling elements can be formed by clipping side portions of nylon, polyester, or any other synthetic fiber monofilament loops which are woven into a substrate cloth as subsidiary warps in the weaving process to form upstanding loops on the surface of the substrate cloth.

Alternatively, the hooks can be molded integrally with the base 406 using a synthetic resin material, or can be co-extruded with the base using a cross head die. The hook elements on a thin base may be laminated to a different sheet form substrate.

In a preferred embodiment, the hooks are integrally extruded and molded with a base tape 406, and are of a polyamide resin, such as nylon 6,6. However, other resins may be used for forming the hooks, such as polyester, polypropylene, PVC, ABS, polyethylene, polystyrene, acetal, acrylic, polycarbonate, polyphenylene oxide, polyurethane, polysulfone and thermoplastic elastomers.

The hooks 402 are distributed over the face of the base 406. An interior region 408 is bounded by a perimeter region 412 of additional hook elements 402. This arrangement can also be seen in part in the elevational cross-section view of FIG. 2B. The pattern of hook placement within either region, such as within the interior region 408, is not critical to the invention and may be chosen according to standard design principals.

The perimeter region 412 is defined as generally being between an interface 410 between the interior region 408 and the outside boundary 411 of the fastening element. The interface 410 is indicated in FIG. 2A as simply a set of lines that form a rectangle.

The hooks 402 in the perimeter region 412 are covered by a cover 413, which may take one of several forms. One form is a space-filling encasement, substantially as described in U.S. Pat. No. 5,540,970 from which this document claims priority, which substantially intimately surrounds the hooks, filling substantially all of the space therebetween inside the perimeter region 412. (For illustration purposes, the hooks 402 are shown as being visible through the cover 413, in the plan view of FIG. 2A. However, this would only be the case if the cover were transparent, which is typically not the case. A more realistic representation is shown in FIG. 3A, where the hooks are only visible where some parts of the cover are broken away.) As can be seen from a comparison of the side and end cross-sectional views, FIGS. 2B and 2C, the cover 412 extends along the entire perimeter of the fastening component.

Another form that the perimeter cover may take, rather than the space filling, hook-encapsulating form, is as a substantially hollow tent or envelope, which contacts only the tips, or possibly the end portions, of the hooks 402, depending on the rigidity of the cover. This type of structure is shown schematically by FIG. 2D, which is substantially identical to FIG. 2C, except that the cover 413' is shown as an envelope, which contacts the tips of the hooks 402 and drapes around them, not filling all of the space around them.

In some cases, depending on the width of the perimeter region between the outside boundary 411 and the interface 410 between the interior region 408 and the perimeter region 412, the perimeter may include some areas where the cover encapsulates and intimately surrounds the hooks, and some areas where the relationship is more like a tent or envelope. Any transition between the two different types of cover region is typically gradual. In general, the wider the region of coverage, the more tent like the cover becomes, with narrower regions of coverage being more fully space-filling. As used herein and in the appended claims, the word "cover" shall be used to refer to both a space-filling, intimately surrounding cover and a tented, enveloping cover that contacts only the tips or end portions of the fastening elements, with some open spaces around the fastening elements, under the cover.

Figure 2B:
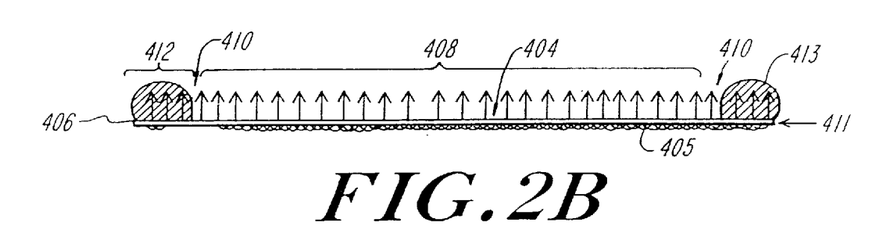
FIG. 2B is a schematic representation in elevational cross-section of the fastener component of the invention shown in FIG. 2A, along lines B—B.
Figure 2C:
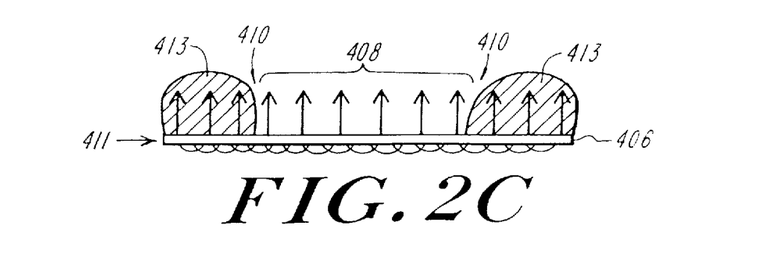
FIG. 2C is a schematic plan representation in elevational cross-section of the fastener component of the invention shown in FIG. 2A, along lines C—C.
Figure 3A:
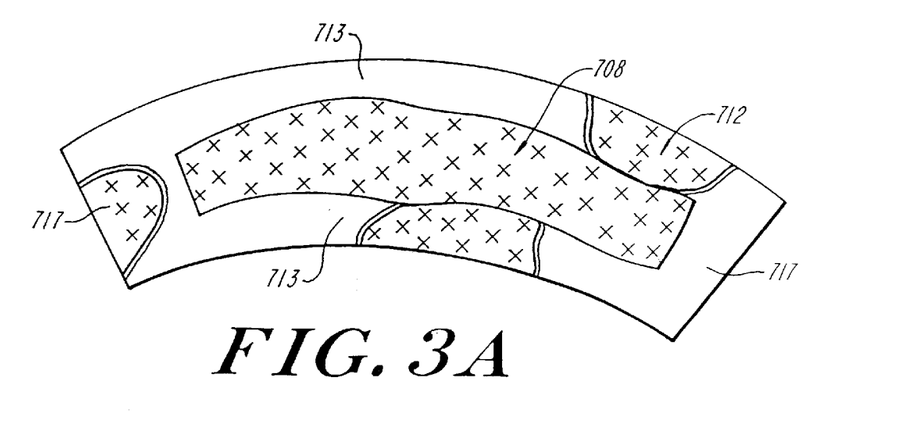
FIG. 3A is a schematic plan representation of a separable fastener component of the invention, having a generally arcuate interior uncovered section and a surrounding annular perimeter section of covered fastener elements, with some parts of the cover broken away.
Figure 3B:
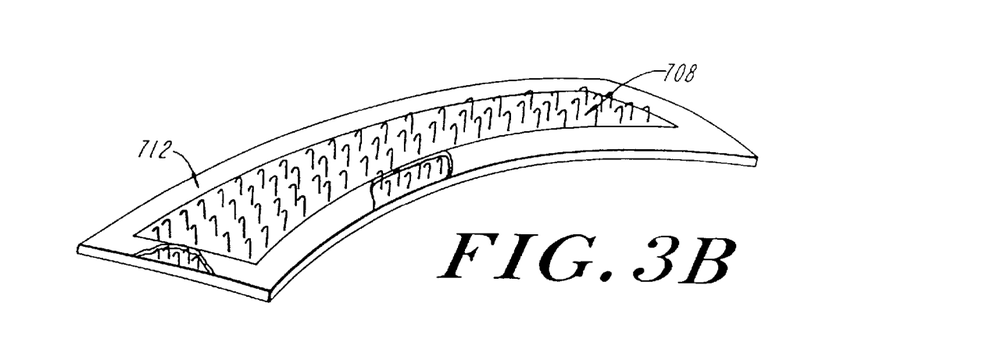
FIG. 3B is a schematic perspective representation of a curved version of a fastener component of the invention shown in FIG. 3A, with some parts of the cover broken away.

FIGS. 2A, 2B and 2C show a fastening component that has a generally rectangular outer border. This is common, but other shapes are also common. FIGS. 3A and 3B show a generally arcuate shaped component, having a curved interior region 708 and an annular perimeter region 712 composed of two arcuate elongated regions 713, joined to each other at their respective ends by two relatively straight sections 717, to form an annular arcuate shape.

Typically, the smallest dimension of the uncovered, interior portion (for use in automotive seating applications) is on the order of between 10 and 40 mm. For the configuration shown in FIG. 2A, the smallest dimension is the distance between the two long sides. This dimension is referred to as the "minor dimension." If the part is a different shape, then the minor dimension will be different. However, it is always defined as the area of the open interior that has the shortest dimension across its width.

Figure 6:
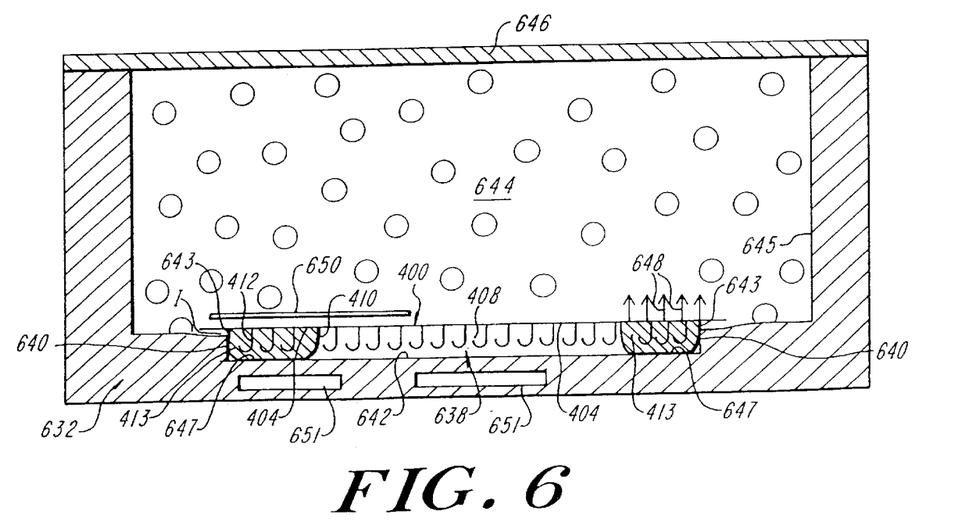
FIG. 6 is a schematic representation, in elevational cross-section, of a separable fastener component of the invention being molded into a foam product, showing the mold, fastener component and foam body.
Figure 7:
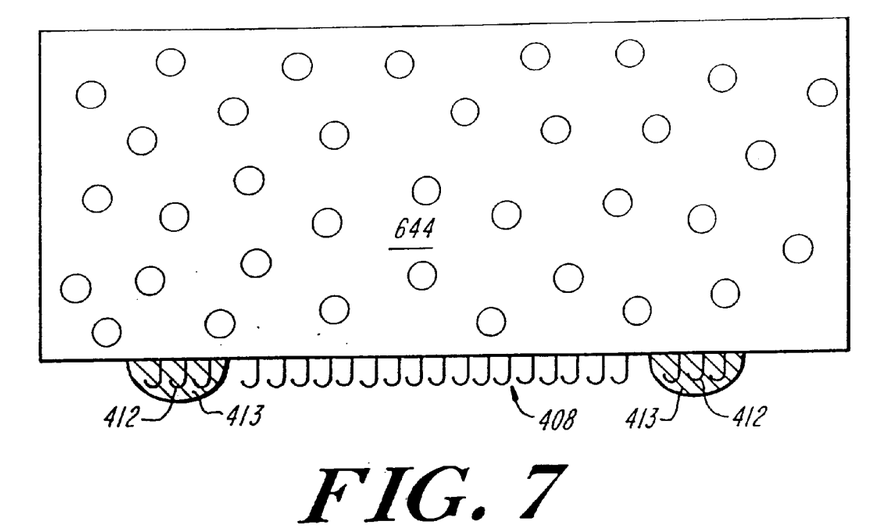
FIG. 7 is a schematic representation, in elevational cross-section, of the separable fastener component of the invention shown in FIG. 6, molded into a foam product, after removal from the mold.

The cooperation between the fastener component of the invention and a mold suitable for use with the invention is shown with reference to FIGS. 6 and 7. The fastener component 400 is provided in a mold 632. The mold has a conventional trench 638, into which is placed the entire hook covered region, including the interior, uncovered region 408 and the perimeter covered region 412. According to a preferred embodiment, the perimeter cover 413 is sized to form a gasket seal against the sidewall 640 of the trench 638, as well as its bottom surface 642.

Molding material 644 fills the mold cavity, and is capped by a top mold 646. With reference to FIG. 6, the purpose of the surrounding perimeter cover 413 will be understood. As the mold material is poured or flowed into the mold, it is typically liquid and may tend to infiltrate between the mold body 632 and the fastening face 404 of the fastener component 400, intruding from the edges of the fastener component 400. As the foam infiltrates, for example, following the path indicated by the curved path I, it meets the perimeter region 412 of hooks that are surrounded by the cover 413, and is at least partially impeded from further progress inward toward the main center region 408 by the gasket seal 643 formed between the cover 413 and the side trench wall 640. Any further inward progress beyond the gasket seal 643 is additionally inhibited by a gasket seal 647 formed between the cover 413 and the bottom trench wall 642. The arrangement shown, substantially completely stops the inward progress of the mold material.

Because the perimeter region 412 of covered hooks completely surrounds the uncovered interior region 408, the molding material cannot intrude into that interior region 408 from any approach.

To insure that the separable fastener 400 (FIG. 6) is securely embedded in the foamed product, anchors 648 may be provided on the non-fastening side of the base 406, opposite to the fastening side.

The anchors are trapped in the foam or plastic of the object being molded, and resist forces tending to pull the fastener component 400 away from the foam body 644. (Such forces arise when a trim cover or other article that is attached to the foam body 644 using the fastener of the invention, is separated.) The anchors may be of any suitable shape, such as mushroom, anchor, hook, low loops, etc. The anchors may be spread uniformly over the entire back surface 405 of the base 406, or may be provided in selected locations only. A molded product of the invention, incorporating the fastener component of the invention, is shown in cross-section in FIG. 7. The hooks in the interior region 408 are free of fouling from the molding material. The covered hooks in the perimeter covered region 412 remain covered after molding.

The presence of the cover material 413 does not prevent the uncovered hooks in the interior region 408 from engaging with loop material.

A major advantage of the present invention is that after the molding process and subsequent curing, the molded object can be removed from the mold, and it is ready for use. It is not necessary for the mold operator to remove any protective film or space filling cover that has been protecting the hooks from fouling. Further, there is no reduction in the fastening integrity of the hooks in the main interior region 408, due to any unfused film residues. (It is also possible to remove the cover 413, if it is fabricated from a removable, elastomeric cover, such as is taught in the Banfield et al. U.S. Pat. No. 5,286,431.)

Figure 8A:
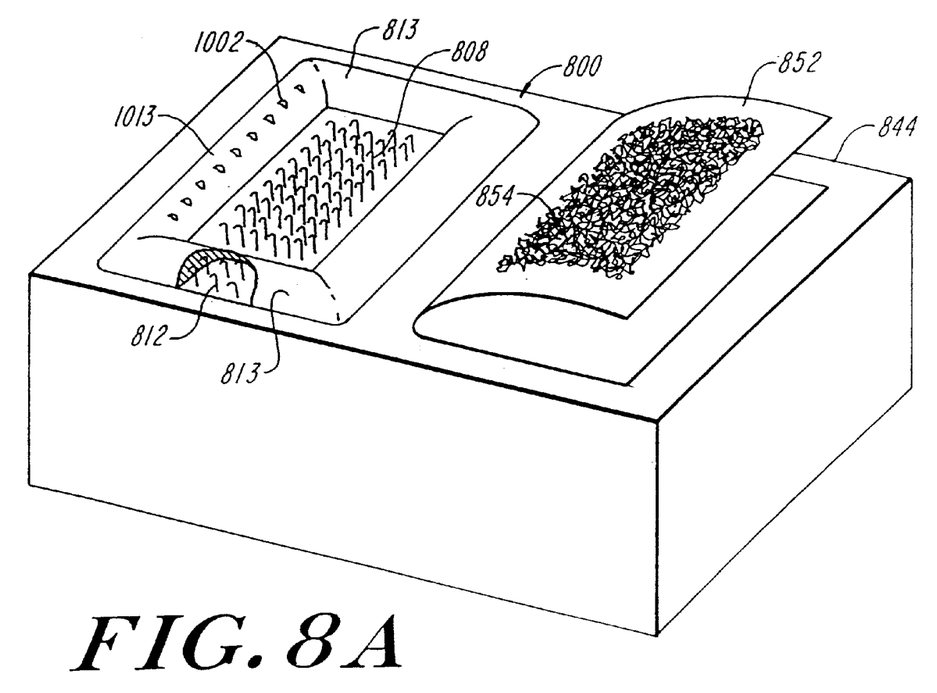
FIG. 8A is a schematic perspective representation of a separable fastener component of the invention, molded into a foam body, capable of being separably fastened to a fabric covering with a cooperating fastener component attached thereto, shown separated.

A molded object 844 of the invention, incorporating a separable fastener component 800 of the invention, is shown schematically in perspective view in FIG. 8A. The molded object may be, for example, a seat cushion for an automobile, or an airplane. A fabric trim cover 852 for the foam cushion 844 is shown schematically as a folded planar sheet, which is fixed to the cushion, for instance with two of the separable fasteners of the invention, one being shown, and designated 800, the other being hidden under the part of the sheet 852 shown in place.

The sheet 852 carries a mating companion fastener component 854, designed to mate with and separably fasten to the hooks or hook-like elements of the embedded separable fastener 800 of the invention. Such material may include, but is not limited to a knitted, woven, and non-woven fabric, napped and un-napped surface or loop-like fibers. These surface elements are referred to below as the "loop-like" elements, or "loops", whether or not they actually are in the form of loops. The sheet 852 is secured to the foam product 844 by engaging the loops 854 with the hooks of the interior region 808 of the embedded separable fastener component 800. The extent of the looped region 854 on the sheet 852 is designed to overlap with the interior region 808 of the embedded separable fastener component 800. The degree of overlap will depend on the relative degree of adhesion required, and the adhesiveness of the particular fastener system being used.

Figure 8B:
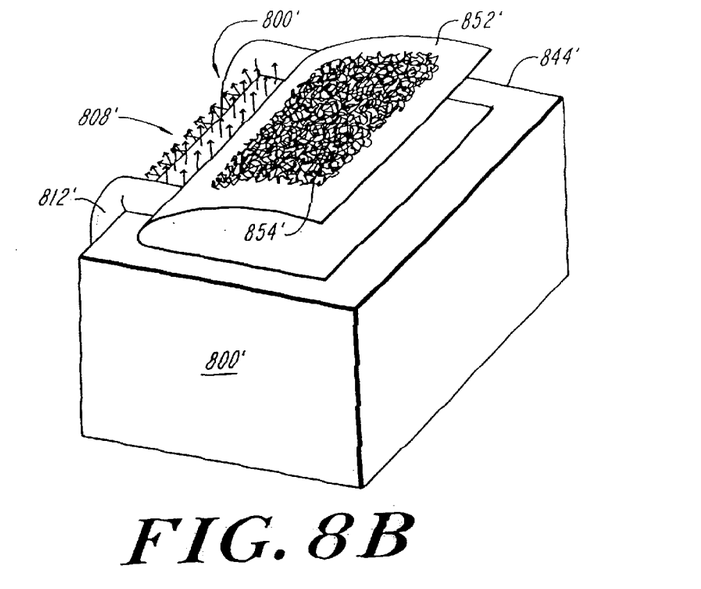
FIG. 8B is a schematic perspective view of a fastener component of the invention adhered to a molded object, such as a foam cushion, around a corner of the molded object.

Another way of using the invention is shown schematically in FIG. 8B. In FIG. 8B, a fastener component 800' has been molded around a corner of a molded product 844', which is of the same type as is shown in FIG. 8A. Again, a loop-bearing fastener component 854' is positioned to mate with and engage the interior, uncovered region 868' of hooks on the fastener component 800'. Again, the covered regions 812' do not interfere with the engagement of the two fastener components.

In general, several related design considerations are important to achieve a reliable product that needs no removable cover when used in the mold. These considerations include the sealability of the fastener component to the mold. The fastener's flexibility, and the magnetic strength that can be applied between the fastener component and the mold. Sealability is the primary consideration. The gasket seal cover must seal the fastening elements, typically hooks, from infiltration. The part must remain flexible to conform to complex contours of the molds and molded parts, such as shown is FIG. 8B. Otherwise, the seal will not be effective. Finally, the magnetic strength or other placement force must be enough to hold the fastener to the mold, and also to aid in sealing, as discussed below. (Rather than magnetic securement, other techniques can be used, such as adhesives and interference fits.)

Figure 4A:
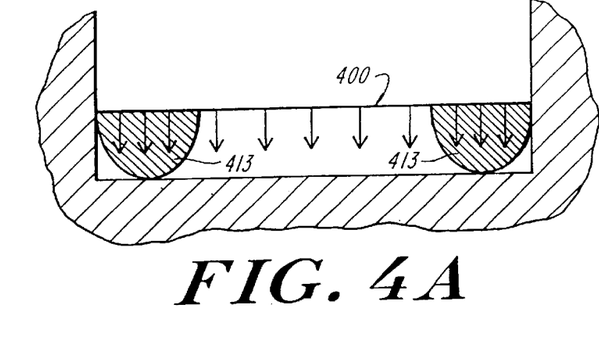
FIG. 4A shows schematically in cross-section a fastener of the invention secured in a mold by a relatively weak magnetic attractive force.
Figure 4B:
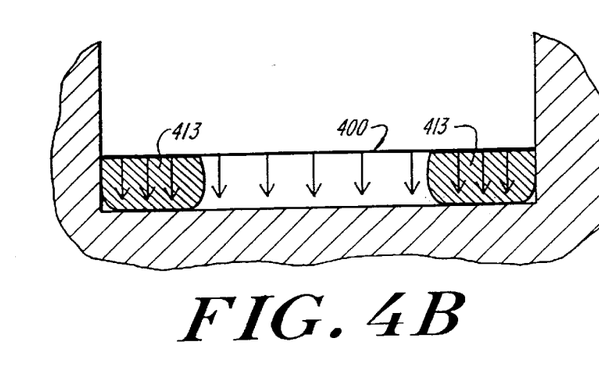
FIG. 4B shows schematically in cross-section a fastener of the invention secured in a mold by a relatively strong magnetic attractive force.

It is important to hold the fastener component 400 tightly to the bottom face of the mold 632 during the time that the foam material is being added, to minimize the chance that the foam material will seep between the fastener component 400 and the mold face, thereby fouling the fastening elements, e.g., the hooks. Typically, the fastener component is held to the face of the mold using magnetic attraction, as is discussed below. The stronger the magnetic attraction between the fastener component and the mold, the better the cover 413 forms a gasket seal. This is shown schematically with reference to FIGS. 4A and 4B. FIG. 4A shows a fastener 400 held to the mold with a relatively weak magnetic force, while FIG. 4B shows the same arrangement with a relatively stronger magnetic force. (No magnets are shown.) The stronger attraction shown in FIG. 4B deforms the cover 413, so that it is compressed in the direction of magnetic attraction and expanded in the direction perpendicular to the direction of magnetic attraction. Thus, it squashes outward to fit the form of the mold side wall and floor for a better seal.

One way to hold the fastener tightly to the face of the mold, as is known, is to introduce a plate or shim 650 (FIG. 6) of magnetic material on the opposite side of the hook component 400 from the mold bottom 632. The mold, being magnetically attractable metal, the fastener component 400 will be forced toward the face of the mold 632. The magnetic material may be coextensive with the fastener component 400, or may be provided in selected locations.

Alternatively, and more frequently, magnets 651 may be incorporated into the mold, and magnetically attractive material may be associated with the fastener component. For instance, magnetically attractive powder may be incorporated into the fastener component to press it toward the mold. It is also possible to include a magnetic attractant in the material from which the hooks are formed, as described in copending, co-assigned U.S. patent application Ser. No. 08/390,876, entitled "Touch Fastener With Magnetic Attractant," in the names of Randall B. Kenney, Brian J. Routhier and Martin I. Jacobs, filed on Feb. 17, 1995, which is incorporated herein fully by reference. This magnetic attractant disclosure discusses many ways to associate magnetic attractant with a fastener component, such as incorporating magnetic attractant in the hooks themselves, in the base to which they are attached, or in a substrate attached to a hook and base assembly. The magnetic attractant can also be incorporated into a loop component, if it is that component that is to be molded into another body.

Alternatively, or in addition, a magnetic attractant can be incorporated into the elastomeric perimeter cover material 413, generally as described in U.S. Pat. No. 5,286,431 to Banfield and Rocha, but with regard to a cover that covers the entire surface of the fastening elements.

The magnetically attractive component may be a metal shim, located anywhere within the body of the fastener, typically connected to the base, or in the position of the magnets 650 shown in FIG. 6. The shim may be porous, as described in copending, co-assigned U.S. patent application Ser. No. 08/568,010 in the names of Samuel Pollard et al., entitled TOUCH FASTENER WITH POROUS METAL CONTAINING LAYER, filed on Dec. 6, 1995, which is fully incorporated herein by reference. A porous metal layer has many advantages over a solid shim. It reduces the weight and the cost of the product. It increases the product's flexibility and facilitates incorporation of the shim between a base layer and a separate substrate layer. A preferred form of porous metal is an expanded metal sheet, as described in the '010 application.

In considering the configuration of the apparatus for magnetic attraction, the designer must balance between: the type of metal used, the amount of material used, and the location of the magnetic attractant relative to the attracting magnets. Typically, mold manufacturers use cobalt-samarium rare earth magnets. Certain materials have better magnetic attraction to such magnets than others. For instance, grain oriented relay steel (high purity iron) and Fe—Si alloys have almost twice the magnetic attraction (in lbs-force) as do low carbon steels. Thus, less material can be used to achieve the same attractive force. Using a smaller quantity of magnetic material generally improves the physical flexibility (i.e., bendability) of the fastener, which improves the sealability of the fastener. This is true generally wherever in the fastener the magnetically attractive material is placed, including in the cover material itself, as a shim, etc. other suitable magnetically attractive materials include equiaxed Fe—Si alloys or relay steels; Fe—Ni alloys; and mu-metal.

Regarding the amount of material used, magnetic attraction is generally linearly related to the mass (thickness, amount) of magnetic attractant used. Each material, however, or physical configuration, will have a different slope for the linear relation. For instance, a 10 g addition of relay steel (having a high magnetic permeability and high saturation density) will have a greater effect than a 10 g addition of regular carbon steel.

Further, changing the location of the magnetic material (e.g., behind the fastener, between the fastener and the mold, inside the body of the fastener) also changes the slope, and the shape of the curves. In general, the closer the magnetic media is to the magnets, the stronger is the force. The relation is not, in general, linear, but is well known.

In balancing these considerations, the designer may want a low-cost, high permeability magnetic media that would provide the maximum force for a minimum amount of material. This results in a low material cost and high flexibility. Other things being equal, the closer that the magnetic attractant can be provided to the magnets, the better.

Figure 1:
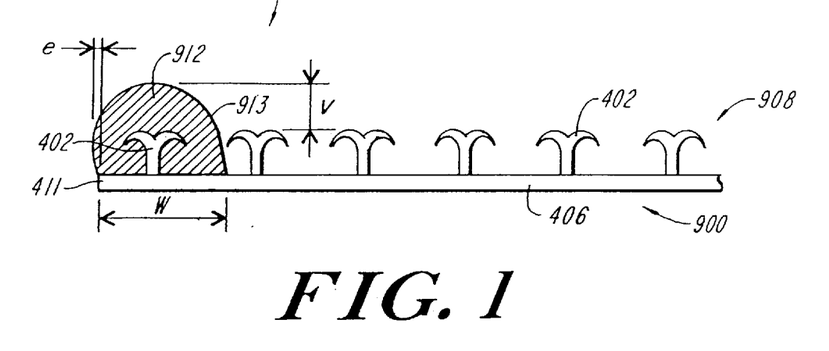
FIG. 1 is a schematic representation, in elevational cross-section, of a portion of a separable fastener component of the invention, showing the loft of an intimately surrounding, space-filling cover over some perimeter fastening elements and some uncovered, interior fastening elements.

Another factor that contributes to the sealability of the gasket covered fastener component is the geometry of the gasket cover 913, as shown schematically in FIG. 1. FIG. 1 shows a cross section of a portion of a fastener, showing some of the hooks 402 of the interior, uncovered region 908 and all of the hooks 402 of a covered region 912, across its width w, as measured between the outer edge 411 of the fastener component 900 and the interface 910 between the uncovered interior region 908 and the covered perimeter region 912. The cover 913 shown substantially fully encapsulates the covered hooks 402 and fills the space around them.

The width w of the gasket cover 913 must be sufficient such that it seals against the intrusion of any foam molding material. The width contributes to the sealability of the fastener in several ways. In general, a wider cover provides more resistance against being deformed. The resistance is due to the increased rigidity of a wider element, as well as the increased retention force due to mechanical anchoring of the additional fastening elements 402 that would necessarily be embedded in a wider cover. Further, a wider cover provides a greater distance through which any infiltrating mold material must flow before it contaminates the hooks in the interior region 908.

Figure 9A:
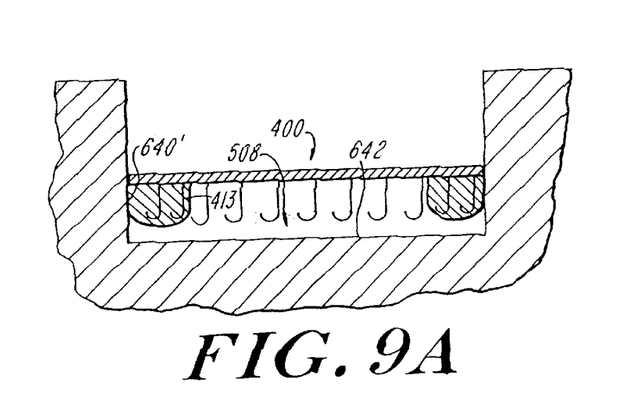
FIG. 9A is a schematic side elevation representation of another embodiment of the invention, where a fastener is secured in a mold trench by an interference fit, with the fastener being substantially the same width as the trench.

On the other hand, the designer will typically try to minimize the width of the cover, as long as it is wide enough to provide a repeatably predictable seal. A preferred embodiment is where the gasket cover covers only between one and two hooks, inclusive, across its width, as shown in FIGS. 1 and 9A. This is because it is typically desired to provide the maximum amount of exposed hooks in the uncovered interior region 908, so that an adequate adherence arises between the fastening elements 402 on the molded part and the corresponding elements on the part to be attached to the molded part, for instance, a fabric trim cover. Thus, for a given area of fastener material, it is desirable to provide a cover that is wide enough to protect against infiltration of the molding material, and no wider. In a preferred embodiment, the width of the gasket cover is generally between 2 and 10 mm, and most preferably is about 3 mm.

The "loft" of the cover is a measure of the degree to which its encapsulating material extends beyond the tips of the hooks, as indicated at "v" and also the degree to which it extends beyond the edge 411 of the base 406, indicated at e. In general, there should be sufficient loft v beyond the tips of the fastening elements 402 to allow for a sufficient degree of compression of the gasket cover 913 under action of the magnetic force, discussed above, in connection with FIG. 4B, to provide an adequate seal against the bottom surface 642 of the mold. Similarly, there should be enough loft e extending beyond the edge of the fastener to provide an adequate seal against the side wall 640 of the trench in the mold. A major factor in establishing the loft v is the relative thickness of the cover, as compared to the height of the fastening elements, e.g. hooks. Typically, the loft v is on the order of between 0 and 3 mm, with about 0.4 mm being preferred. The loft v will be dependent upon the hardness of the gasket material; i.e., a softer material requires more loft v, so that, as it compresses, it does not "bottom out" on the hook tips before sealing.

Figure 2D:
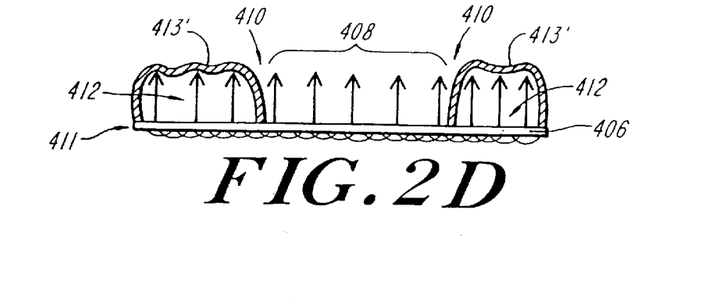
FIG. 2D is a schematic representation in elevational cross-section of a portion of a separable fastener component of the invention similar to that shown in FIG. 2A, but having a tented, non-space-filling cover over some perimeter fastening elements.

The loft is also affected by the width w of the cover 913, at least in connection with the method of making the product that is disclosed below. Narrower gasket covers tend to pinch down below the height of the fastening element hooks. A wider gasket will not surround and encapsulate the hooks, but will "tent" across the top, as shown in FIG. 2D. A fully space-filling gasket cover 913 is generally more preferable than a tenting, non-space-filling gasket cover; however, both are contemplated as embodiments of the invention.

It is preferable for the gasket cover all around the perimeter of the fastening component to have the same width w and the same loft v above and e beside the fastening elements. If the loft v beyond the tops of the fastening elements is not uniform, and the force attracting the fastener to the mold bottom is not great enough, gaps can arise at the locations of minimal loft, causing fouling of the fastening elements.

The material used for the cover has an impact on the gasket cover's sealability. One factor to consider is the elasticity, or ability to deform. In order for the gasket cover to seal well, it must deform in the mold under the pressure of the magnetic attraction. Softer materials, like polyethylene foams (both cross-linked and uncross-linked) will deform easily, while harder materials will deform less. However, the material must not be so soft that it deforms under the pressure of the molding material, as it tries to pass through the gasket cover.

In general, lower density materials are also preferred. Polyethylene foam in the range of from 1.5 to 4.5 lbs/f$^3$ (24.0 to 72.1 kg/m$^3$) has been successfully used. Denser materials deform less readily, and may not seal as well. Further, less dense materials tend to cost less per part. On the other hand, the density of the cover material affects the degree of adherence between the cover material and the fastening elements, with a denser material sometimes adhering more strongly. Thus, a balance must be taken between these considerations.

Cross-linked polyethylene foams (thermosets) have been used, but these are not readily recyclable, which would be desired. Uncross-linked polyethylene foams are recyclable. Incorporating an EVA (ethylene vinyl acetate) modifying agent into a polyethylene foam may help it to stick to a nylon hook substrate when heated.

Another of the important design factors of the fastener component is its overall flexibility. This is primarily a function of the stiffness and the amount of the materials used. Minimizing the thickness of any metal shim results in a more flexible part, which is more likely to seal in contoured molds such as shown in FIG. 8B, where a fastener component is bent around an exterior corner of a foam cushion. Also, using a highly flexible cover helps to produce a flexible part and a gasket that will seal well. If a binder (adhesive glue) with encapsulated magnetic particles is painted onto the gasket, that may make the fastener component stiff and boardy. This configuration would require more magnetic strength to make the part contour to the mold. However, if a softer binder is used, that may require less magnetic strength to be used.

Figure 9B:
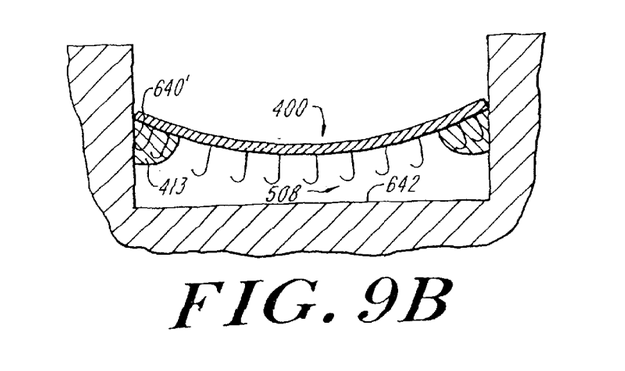
FIG. 9B is a schematic side elevation representation of another embodiment of an interference fit, with the fastener being wider than the trench.

In the embodiment of the fastener of the invention discussed above in connection with FIG. 4B, it has been mentioned that it is beneficial to have the fastener pushed tightly against the bottom 642 of the trench in the mold wall. The gasket cover forms two gasket seals: one with this bottom wall 642 and one with the side wall 640. Another embodiment of the invention is shown in FIG. 9A, where the fastener component is designed to remain spaced from the mold wall 642 at the bottom of the trench. Rather, the width of the fastener component, as measured between the two side mold walls 640', is sized to create an interference fit between these two side walls. In other words, the width of the part is slightly greater than the distance between the two walls. The part has sufficient flexibility, and lateral loft e of the cover gasket 413 around the border of the fastening component, such that a seal is formed between the gasket 413 and the side wall 640', which gasket seal is sufficient to prevent the inflow of molding material into the uncovered region 508. FIG. 9B shows another interference fit, where the fastener is sufficiently wider than the trench to cause a noticeable bending of the fastener component.

Figure 9C:
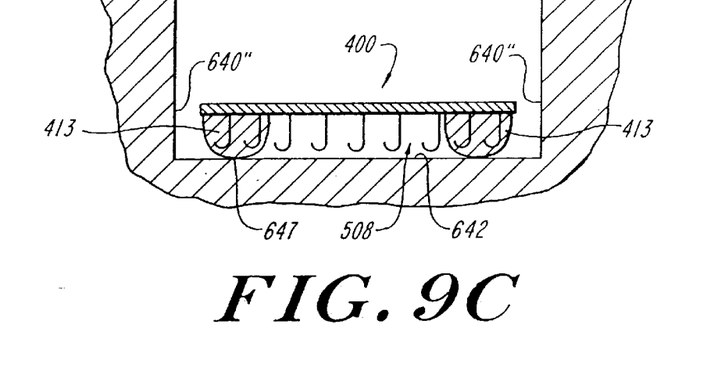
FIG. 9C is a schematic side elevation representation of another embodiment of a fastener component of the invention inserted in a mold trench, with the fastener being narrower than the trench.

If the attractive force between the fastener 400 and the bottom wall 642 of the trench is high enough, it may be possible to size the trench such that there is no contact between the gasket cover 413 and the to side walls 640". As shown in FIG. 9C, the entire sealing function is accomplished by the gasket seal 647 between the gasket cover 413 and the trench bottom wall 642.

Examples of useful molding materials for constituting the product into which the fastener is incorporated include polyurethane, polystyrene, polyvinyl chloride, polyolefin, polyester, polyamide, synthetic rubber, and the like. The molding material may be charged into the mold in a liquid, granular, or powdery form, whichever is suitable. Once cured, the molded article may be soft and foamy, such as a cushion. Alternatively, it may be hard and relatively inflexible, such as a polystyrene.

Examples of useful materials for the gasket cover include: polyolefins (thermoplastics and thermosets); polyethylenes (thermoplastics and thermosets); polyurethanes; vinyls (polyvinyl chlorides); silicone; styrene butadiene rubber; natural rubber; ethylene vinyl acetate (EVA); and ethylene propylene rubber (EPDM). Any of the foregoing may be foamed or unfoamed.

EXAMPLE OF FASTENER COMPONENT

Samples processed in a polyurethane foam mold were made of molded polyamide hooks with a laminate polyester knit loop backing. The component was rectangular, as shown in FIG. 2A. The cover material was a cross-linked polyethylene foam, having a density of 4 lbs/ft$^3$ (64 kg/m$^3$). The loft v was on the order of 0 to 2 mm and the width of the gasket cover was on the order of 3 to 5 mm. The cover covered between one and two hooks across its width. Molding foam did not intrude into the interior hook area. The bond to the molding foam was sufficient. The hooks would engage with the trim cover backing loop component.

Figure 5:
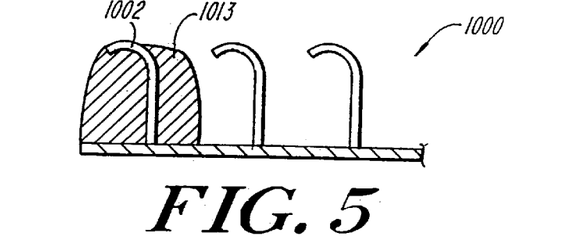
FIG. 5 shows schematically a cross-sectional view of an embodiment of the invention having a space-filling cover with the tip of the covered engaging element slightly exposed.

The foregoing description has generally assumed that the gasket cover will completely cover the full extent of any hook that is covered by it, as shown in FIGS. 1 and 2A. However, as shown in FIG. 5, it is also possible to size the gasket cover 1013 and the fastening elements, e.g. hooks 1002, such that a small portion of the hooks, e.g., the very tip surfaces, pushes through the cover layer, creating a plurality of "pinholes" in the top of the cover (as shown schematically in FIG. 8A). (FIG. 8A shows one extent of the gasket cover being pierced with the tips of the hooks 1002, while the other extents are not pierced. This is a hybrid combination shown for illustration only. Typically, all extents of the gasket cover would be either pierced or not pierced.) This is similar to the configuration described in the above mentioned and incorporated by reference U.S. Pat. No. 5,540,970. Care must be taken to insure that the amount of fastening element that pokes through the gasket cover is not so much as to prevent the gasket cover from establishing an effective seal against the intrusion of molding foam. The appropriate amount of any tip exposure will depend on factors that include the amount of side loft e, the flexibility and softness of the gasket cover material, the viscosity of the foam molding material, and the width w of the gasket cover.

In some cases where it is desired to remove the gasket cover after molding and before the trim cover is engaged with the molded object, these "pinholes" make removal of the gasket cover easier, as it is believed that they prevent a suction force from forming as the hooks are pulled out of the encasement. Cost is also reduced, because less material is used to make the thinner gasket cover. Ease of removal and removal without breaking are important features of this removable embodiment of the present invention, as such qualities prevent manufacturing slowdown when a fastener according to this aspect of the invention is used in an assembly line environment.

Turning now to a method for the fabrication of the fastener component discussed above, the present invention is particularly suited to making fastening components of any arbitrary shape with a perimeter cover gasket. This is particularly advantageous, because many known methods can only produce generally rectangular or regular parallelepiped shapes, and there are many applications that require other shapes, such as an arcuate shape.

Figure 11:
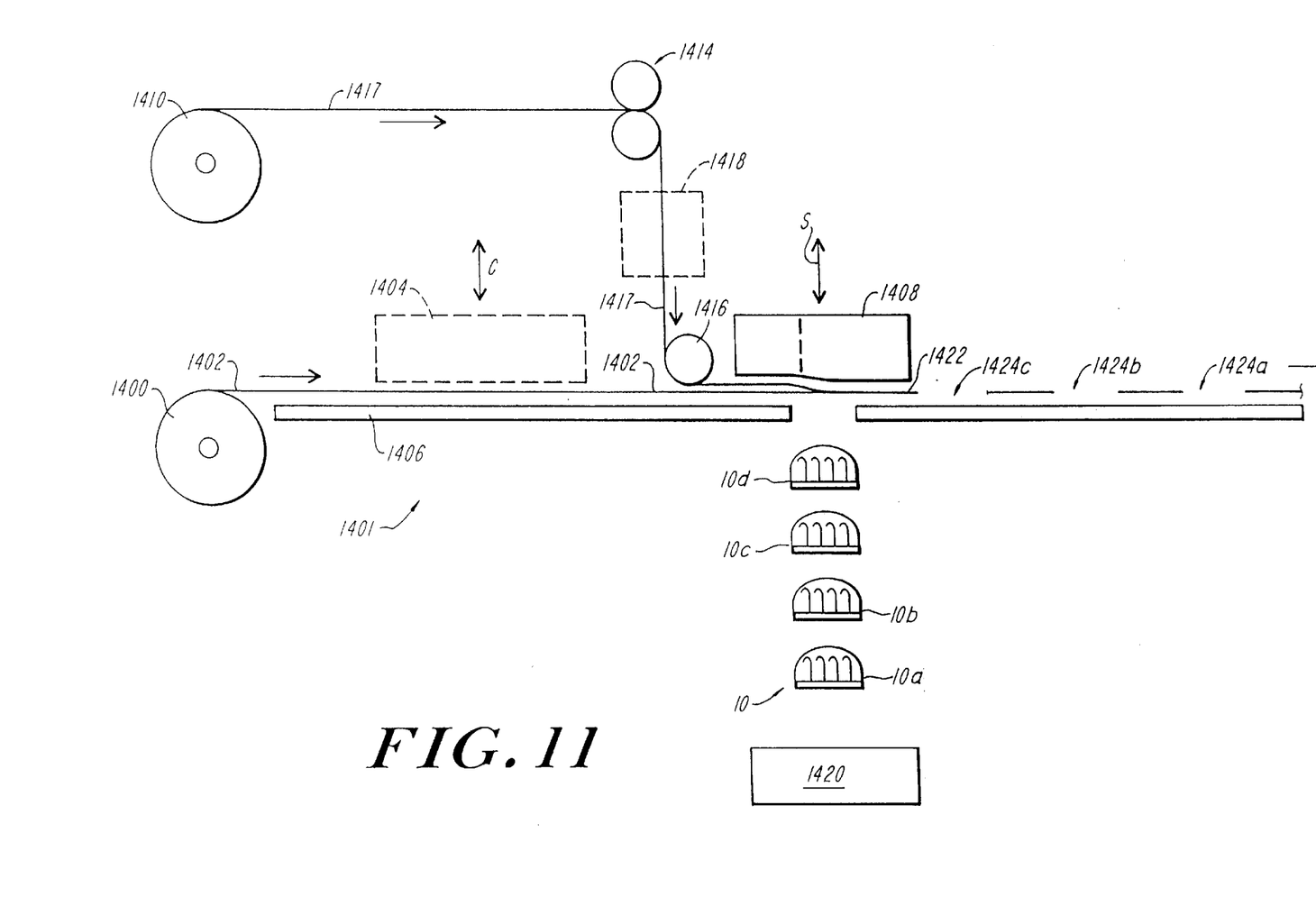
FIG. 11 is a cross-sectional side elevation view of an assembly line of machinery for assembling a web of fastening elements and a web of cover material, removing portions of the cover over an interior region of fastening elements and cutting a shaped article from the combined webs.

As shown schematically in FIG. 11, a roll 1400 of fastener component is provided to a shape forming unit 1401. The fastening component roll 1400 may or may not include a magnetically attractive component, such as magnetically attractive hooks or base as described in the above mentioned U.S. Ser. No. 08/390,876, or a porous metal shim layer as described in the above mentioned U.S. Ser. No. 08/568,010, TOUCH FASTENER WITH POROUS METAL CONTAINING LAYER. These two forms of magnetically attractive fastening component are particularly conducive to the method of forming arbitrarily shaped fasteners, described below. The roll 1400 may also include a separate backing substrate, although it need not. Alternatively, an additional web of porous metal can be joined with the web of fastener material in a production line, such as is shown in FIG. 11, described in more detail in the above mentioned '010 disclosure. The roll 1400 may be rather wide, such as from one foot (30.5 cm) to five feet (152 cm) (in the direction perpendicular to the plane in which FIG. 11 is drawn).

The web 1402 of fastener component is indexed through a heater 1404 to a combination cutting/sealing stage, under a cutting die 1408.

Along another web feed line, the cover material is being prepared for combination with the fastening material. A roll 1410 of the cover material is suitably arranged so that the web 1417 of cover material can pass through a heater 1418 and be presented to the cutting die head 1408. Conventional rollers 1414 and 1416 perform this function. Beneficial results have been obtained by heating both the hook web and the cover web to approximately the same temperature, though this is not required to manufacture the gasket in all cases.

Figure 10A:
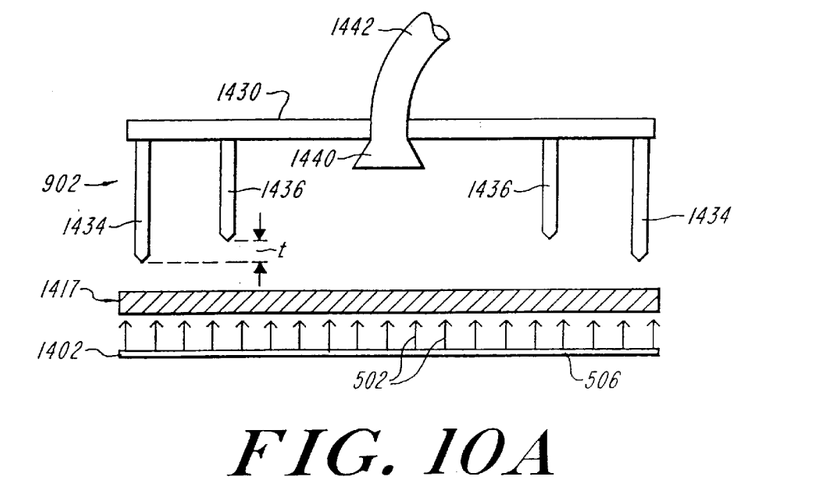
FIG. 10A shows schematically a die for use in fabricating a fastener of the invention, in a retracted position.
Figure 10B:
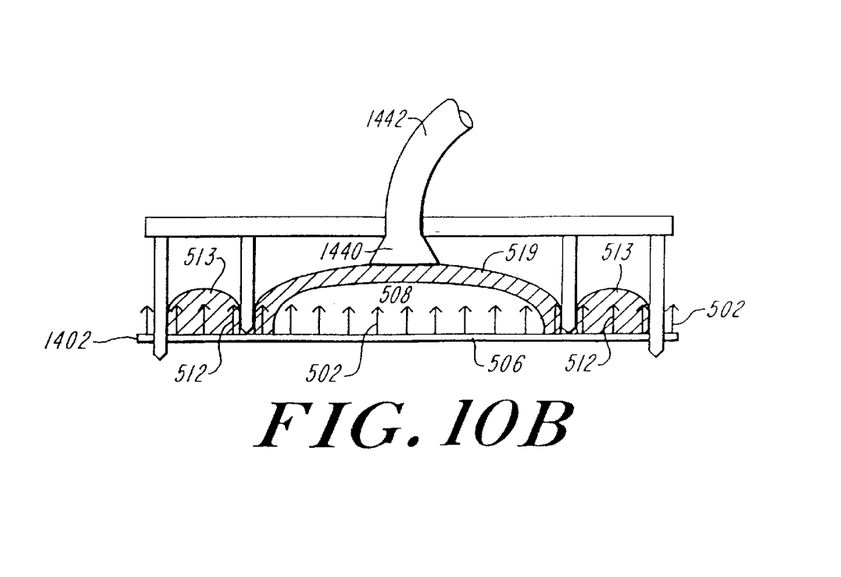
FIG. 10B shows schematically the die of FIG. 10A in a cutting position.

The two webs 1402 (fastening elements) and 1417 (cover) are mated just upstream of the cutting die head 1408, which has one or multiple dies 902 (shown in FIGS. 10A and 10B) for cutting out fastening components of the desired shape (FIG. 10B). In the case shown, for simplicity, a single die cuts a single shape 10 on each cycle. In the embodiment shown, the die head 1408 reciprocates up and down, in the directions indicated by the two headed arrow S.

Four already cut pieces, $10_a$, $10_b$, $10_c$, and $10_d$, are shown schematically being removed in a stream from the combined webs 1402 and 1417 and the stamping die head 1408 into a collection container 1420. At the cutting die, the two webs 1417 and 1402 are combined into a single two layer web 1422, due to the engagement between the fastening elements of the web 1402 and the cover web 1417, leaving a matrix of loosely combined sheets and holes. The combined sheet matrix 1422 moves on, in the machine direction, indicated by the arrow M, with holes 1424 cut in the sheet. The locations of three holes, $1424_a$, $1424_b$ and $1424_c$ are shown, from which were cut shaped components $10_a$, $10_b$ and $10_c$ respectively.

According to one method, the shaped components are of the type shown in FIGS. 3A and 3B, at this point having a perimeter region that is covered, and an interior region that is also covered, but by a cover that is easily removed by hand.

A suitable cutting die 902 is shown schematically in cross-section in FIGS. 10A and 10B. A frame 1430 carries a fixed perimeter blade 1434, which is in the shape of the perimeter of the piece to be formed, like a conventional cookie cutter. The perimeter blade 1434 may be continuous, or, it may be made up of different segments. It is typically made of forged steel.

Spaced toward the interior from the perimeter blade 1434 is another blade 1436, which is also formed like a cookie cutter, in the shape of the outline of the interface 410 (FIG. 2A) between the interior, uncovered region and the perimeter covered region 412. The perimeter blade 1434 is slightly longer than the interior blade 1436, an amount t, discussed below.

In operation, the combined webs 1417 and 1402 of cover and fastening elements respectively, are indexed to register with the cutting die 902. The die advances toward the piece, and the perimeter blade 1434 encounters the cover web 1417 before the interior blade 1436. First the perimeter blade 1434 and then the interior blade 1436 force the cover web 1417 into contact with the fastening element web 1402, embedding the fastening elements 502 in the perimeter region 512 into the foam cover web 513 to a degree that the two webs are anchored together to some degree. Some of the fastening elements 502 in the interior region 508 may also become embedded in the cover, causing some anchoring in the interior region 508 also. If the goal is to have the cover completely fill the space around the covered fastening elements in the perimeter region 512, such as shown in FIG. 2B, the cover material is chosen accordingly and pressed down to a degree sufficient to achieve such penetration and space filling surrounding the fastening elements. If the goal is to have the cover tent over and not completely fill the space around the covered fastening elements, such as shown in FIG. 2D, then that arrangement is achieved at this time.

As the cutting die 902 continues to move downward, the perimeter blade 1434 cuts through both of the joined cover 1417 and fastening element 1417 webs, leaving the fastening elements within the perimeter blade enclosed within an envelope of the cover web 1417. Simultaneously, the interior blade 1436 cuts through the cover web 1417 at the interface between the interior region 508 and the perimeter region 512, but does not cut through the fastening element web 1402. The cut piece is removed from the remaining web matrix.

It is also beneficial, although it is not shown, to use common rule dies, if more than one part is being cut at one time. This minimizes waste in the product, and reduces the linear amount of material that must be cut and the weight of the die.

It has been mentioned above that the cover web 1417 in the interior region can remain on the part as it is being cut from the remaining matrix, and removed manually afterward. A more preferred method is facilitated using the apparatus shown in FIGS. 10A and 10B. A vacuum head 1440 is connected through a hose 1442 to suitable vacuum pump machinery. As the interior blade 1436 cuts through the cover web 1417, vacuum pressure is applied, but only in the interior region within the interior blade 1436, so that the hooks 502 in the interior region 508 do not become embedded in the web cover 1417. The interior portion of the web cover 1417 pulls away from the hooks, due to its having been cut, and is drawn up into the vacuum head 1440, and through the tube to a collection receptacle. The cover material can then be recycled or disposed of.

Another technique, not shown, is to use a mechanical cover removal apparatus, such as a rotating wheel, in place of the vacuum head, which draws away the unwanted interior cover portion, using web handling techniques, such as are used in photocopy machines, etc.

A slightly modified arrangement is also possible, where the cover removal does not happen simultaneously with the cutting, but happens before the part is removed from the matrix. According to this method, the cutting head 1408 is replaced by two stages: the first cuts out the part and cuts through the cover at the interface as described above; the second, which is downstream of the first, removes the interior cover in an appropriate manner, such as vacuum, or mechanical web handling. This is indicated schematically in FIG. 11 by the dotted line through cutting head 1408, to indicate that two processes may occur in series within the general limits of the cutting head.

Thus, any arbitrarily shaped piece can be cut, and the protective gasket cover will be secured to the shape around the perimeter sufficiently to prevent foam material from intruding into the region of uncovered fastening elements. There is no need for adhesives to secure the cover to the fastening elements, but adhesives may be used in some circumstances. There is no need to be limited to shapes that are generally rectangular or straight sided in shape. The apparatus can fully seal the component against foam-intrusion around any arbitrary shape. This has a great advantage over the use of relatively thin strips of protective material adhered along straight marginal edges, which are only conducive to use in rectangular strip pieces.

The gasket cover should be sufficiently impervious to molding material around its perimeter, such that during the molding process, substantially no molding material can intrude into the region where the uncovered fastening elements are. The gasket cover need not be absolutely impervious to every material, nor must the gasket seal fully surround the perimeter. All that is necessary is that the perimeter be sealed to the extent that it is substantially impervious to the molding material, such that molding material is excluded from contacting the fastening elements. Thus, there may (although need not be) gaps in the gasket seal around the perimeter to some limited degree.

EXAMPLE OF PART FORMATION

A web of nylon hook material, with a hook shape such as is sold by Velcro USA under trade designation Ultra-8™, is attached to a web of cover material made from foamed polyethylene having a thickness of about 0.125 inch (3.2mm) gauge manufactured by Voltek of Coldwater, Mich. Both are heated to approximately 250° F. (121° C.). The cutting die has a blade temperature of 75° F. (24° C.), In general, the thickness of the cover should be about 0.015 inches (0.4 mm) thicker than the height of the fastening elements.

In other examples, where either the foam cover alone or the hooks alone are heated, or neither is heated, an acceptable part is formed.

The bevel of the blades 1434 and 1436 of the cutting die also affects the loft and width of the gasket cover. As shown in FIG. 10A, both the perimeter blade 1434 and the interior blade 1436 have center bevels.

Rather than applying a cover over the entire area of the fastening elements, and then removing the interior portion, other techniques are possible. A drawback of the method discussed above is that it requires the fabrication and handling of a large amount (weight, volume, width) of cover web material, most of which is removed almost immediately, and which must be recycled in some fashion, or thrown away as waste. Another technique is to form a gasket cover in-situ, only covering the hooks around the perimeter of the outline of a part, for instance three mm wide, and then to cut the part out after the gasket is formed. The forming can be accomplished using a robotic, computer controlled spray nozzle, to spray foam material in the outline of the part.

In the foregoing discussion, it has been generally assumed that the component of the fastener system that is being embedded into the foam article is the hook carrying component. However, this is not required. The invention works satisfactorily using a loop carrying component to be embedded into the foam product, rather than a hook carrying component. In that case, there is an interior looped region surrounded by a perimeter region of covered loops. In general, the cover material for covering loops must be softer and more flowable at the time of application, since the loops cannot force their way into a solid foam cover. The choice of using hooks or loops for the embedded product depends on many factors, including the foam type, the use for the foamed product and its shape, as well as the use of and shape of the material that must carry the mating component, i.e., the non-embedded component. Also of consideration is the assembly process of the finished parts. For instance with the seat cover use, typically the fabric covers that are waiting to be installed are stacked one on top of another, with the fastener component adjacent to the next fabric cover. The loop-type component is used for the fabric covers, because hook-type components would snag the adjacent fabric.

The shape of the fastener component may be any arbitrary shape.

The foregoing discussion should be understood as illustrative and should not be considered to be limiting in any sense. While this invention has been particularly shown and described with references to preferred embodiments thereof, it will be understood by those skilled in the art that various changes in form and details may be made therein without departing from the spirit and scope of the invention as defined by the claims.

For instance, the interior region need not be located exactly in the center of the fastener component. It may be located anywhere within the interior, as long as it is bounded by a perimeter of covered hooks that are sufficient to prevent molding material from fouling the fastening elements in the interior. There may be more than one uncovered open areas, each bounded by perimeter regions of covered fastening elements, looking somewhat like fields bounded by walls or dikes.

Having described the invention, what is claimed is:

1. A method for embedding a separable fastener component into a molded article, said method comprising the steps of:
  a. providing a separable fastener component comprising:
     i. a base member, having a nominal fastening face and a non-fastening face;
     ii. carried on said fastening face, a pattern of a first type of fastening elements, said fastening elements selected from the group consisting of hook and loop elements, said pattern comprising:
        A. an interior region of fastening elements, free of any cover;
        B. substantially surrounding said interior region, a perimeter region; and
     iii. covering each of said fastening elements of said perimeter region, a cover;
  b. placing said separable fastener component into a mold, with said fastening face facing a wall of said mold, said wall of said mold comprising a trench shaped and sized to accommodate both said perimeter region carrying covered fastening elements and said interior region carrying uncovered fastening elements;
  c. securing said separable fastener component against said mold such that at least one gasket seal is formed between said cover and said mold wall; and
  d. providing molding material to said mold, particularly in the region of said placed separable fastener.

2. The method of claim 1, said trench shaped and sized to accept said fastener component substantially without interference, said securing step comprising the step of attracting said fastener component to said mold wall using magnetic attraction sufficient to deform said cover to a degree sufficient to form a gasket seal against substantially any intrusion of any molding material into said uncovered interior region.

3. The method of claim 1, said trench shaped and sized to accept said fastener component with an interference fit of sufficient tightness to retain said fastener component in a fixed position during said step of introducing molding material into said mold, said step of placing comprising the step of flexing said fastener component during introduction into said mold to a degree sufficient to deform said cover to a degree sufficient to form a gasket seal against any substantial intrusion of any molding material into said uncovered interior region.

4. A method for making a separable fastener component, said method comprising the steps of:
 a. providing a separable fastener component comprising:
  i. a base member, having a nominal fastening face and a non-fastening face;
  ii. carried on said fastening face, a pattern of a first type of fastening elements, said fastening elements selected from the group consisting of hook and loop elements; and
 b. covering a perimeter region of said fastening elements that substantially surrounds an interior region of said fastening elements with a cover that contacts said base around substantially the entire interior region by the steps of:
  i. applying said cover over said interior and said perimeter regions; and
  ii. removing said cover from covering said interior region, while leaving said cover intact upon said perimeter regions.

5. A method for making a separable fastener component, said method comprising the steps of:
 a. providing a separable fastener component comprising:
  i. a base member, having a nominal fastening face and a non-fastening face;
  ii. carried on said fastening face, a pattern of a first type of fastening elements, said fastening elements selected from the group consisting of hook and loop elements; and
 b. covering a perimeter region of said fastening elements that substantially surrounds an interior region of said fastening elements with a cover that contacts said base around substantially the entire interior region by covering only said fastening elements that compose said perimeter region and not covering any of said fastening elements of said interior region.

6. The method of claim 5, further comprising the step of cutting a part of a finished shape from a larger piece of fastening element carrying base member, by cutting said shape out around the outside of said perimeter covering.

7. The method of claim 5, said step of covering comprising the step of applying a foam material to said perimeter region.

8. The method of claim 7, said step of applying foam comprising the step of applying foam using a computer controlled spray device.

9. The method of claim 5, said step of covering comprising the step of covering with a cover of a material selected from the group consisting of: thermoplastic polyolefins, thermoset polyolefins, thermoplastic polyethylenes, thermoset polyethylenes, polyurethanes, vinyls, polyvinyl chlorides; silicones; styrene butadiene rubbers; natural rubbers; ethylene vinyl acetates (EVA); and ethylene propylene rubber (EPDM).

10. The method of claim 9, said step of covering comprising the step of applying said cover material in a foamed condition.

11. The method of claim 9, said step of covering comprising the step of applying said cover material in an unfoamed condition.

* * * * *